US008607539B2

(12) United States Patent
Uehata et al.

(10) Patent No.: US 8,607,539 B2
(45) Date of Patent: Dec. 17, 2013

(54) ORGANOPOLYSILOXANE COMPOSITION AND PROCESS FOR PRODUCING ROPE STRUCTURE WITH THE SAME

(75) Inventors: Akihiro Uehata, Kurashiki (JP); Yuji Ogino, Kurashiki (JP); Mariko Mine, Kurashiki (JP); Youichi Yamamoto, Kurashiki (JP); Masao Kawamoto, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 507 days.

(21) Appl. No.: 12/885,616

(22) Filed: Sep. 20, 2010

(65) Prior Publication Data

US 2011/0009550 A1 Jan. 13, 2011

Related U.S. Application Data

(63) Continuation of application No. PCT/JP2009/000642, filed on Feb. 17, 2009.

(30) Foreign Application Priority Data

Mar. 25, 2008 (JP) ................................. 2008-078670

(51) Int. Cl.
*D02G 3/40* (2006.01)
*B32B 9/04* (2006.01)

(52) U.S. Cl.
USPC .............................. 57/250; 428/447; 428/480

(58) Field of Classification Search
None
See application file for complete search history.

(56) References Cited

U.S. PATENT DOCUMENTS

| | | | |
|---|---|---|---|
| 4,119,642 | A | 10/1978 | Larock |
| 4,931,233 | A | 6/1990 | Miyahara et al. |
| 5,232,742 | A | 8/1993 | Chakravarti |
| 6,945,153 | B2 | 9/2005 | Knudsen et al. |
| 7,385,001 | B2 * | 6/2008 | Shim et al. ..................... 524/837 |
| 2004/0219373 | A1 | 11/2004 | Deruelle et al. |
| 2007/0202331 | A1 * | 8/2007 | Davis et al. ..................... 428/375 |
| 2007/0277326 | A1 | 12/2007 | Deruelle et al. |
| 2012/0198808 | A1 * | 8/2012 | Bosman et al. ................. 57/1 R |

FOREIGN PATENT DOCUMENTS

| | | |
|---|---|---|
| CA | 1 228 957 | 11/1987 |
| CN | 1512005 A | 7/2004 |
| CN | 1918231 A | 2/2007 |
| EP | 1 431 450 | 6/2004 |
| JP | 59-9270 | 1/1984 |
| JP | 02-210072 | 8/1990 |
| JP | 04-364110 | * 12/1992 |
| JP | 07-305277 | 11/1995 |
| JP | 09-163489 | 6/1997 |
| JP | 2003-137609 | 5/2003 |
| JP | 2003-261765 | 9/2003 |
| JP | 2004-524244 | 8/2004 |
| JP | 2005-226199 | 8/2005 |
| JP | 2006-518011 | 8/2006 |
| JP | 2007-016333 | 1/2007 |
| JP | 2007-160759 | 6/2007 |
| JP | 2004-197263 | 7/2007 |
| JP | 2007-523267 | 8/2007 |
| JP | 2009-527661 | 7/2009 |
| WO | 02/059024 | 8/2002 |
| WO | WO 2007/005459 | 1/2007 |
| WO | WO 2007/101035 | 9/2007 |

OTHER PUBLICATIONS

Abstract for JP 04-364110 (Dec. 1992).*
Office Action issued Mar. 12, 2012 in Chinese Patent Application No. 200980110303.6 (with Partial English translation).
Chinese Office Action issued Sep. 10, 2012, in China Patent Application No. 200980110303.6 (with English translation).
International Preliminary Report on Patentability with Written Opinion mailed Nov. 18, 2010, in PCT/JP2009/000642 filed Feb. 17, 2009.
The Extended European Search Report issued Apr. 10, 2012, in Europe Application No. / Patent No. 09724428.9.
Chinese Fourth Office Action issued Mar. 21, 2013, in China Patent Application No. 200980110303.6 (with partial English translation).
Australian Office Action Issued May 23, 2013 in Patent Application No. 2009230655.
Office Action issued Dec. 31, 2012 in Chinese Patent Application No. 200980110303.6 (with partial English translation).
Office Action issued May 21, 2013 in Chinese Patent Application No. 200980110303.6 (with partial English translation).
Communication pursuant to Article 94(3) EPC issued Apr. 25, 2013 in European Patent Application No. 09 724 428.9.
Patent Examination Report No. 1 issued May 23, 2013 in Australian Patent Application No. 2009230655.

(Continued)

*Primary Examiner* — Marc Zimmer
(74) *Attorney, Agent, or Firm* — Oblon, Spivak, McClelland, Maier & Neustadt, L.L.P.

(57) ABSTRACT

Provided are an organopolysiloxane composition for producing a rope structure excellent in fatigue resistance, a rope structure using the same, and a process for producing the rope structure. The organopolysiloxane composition comprises an organopolysiloxane having an average polymerization degree of 50,000 to 200,000 and represented by the following formula (I):

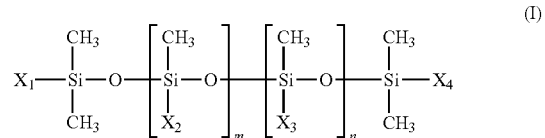

wherein X1, X2, X3 and X4 are the same or different, each independently representing —H, —OH, —COOH, —R, —NH$_2$, —ROH, —RCOOH, or —RNH$_2$; R representing an alkyl group or an aryl group; and each of m and n independently denotes an integer of not less than 1. The organopolysiloxane composition is applied to liquid crystalline polymer filaments in the process of producing the rope structure from the filaments.

10 Claims, 1 Drawing Sheet

(56) References Cited

OTHER PUBLICATIONS

Decision of Rejection issued Aug. 30, 2013 in corresponding Chinese Application No. 200980110303.6.
Decision of Grant issued Sep. 10, 2013 in correspondence Japanese Application No. 2010-505291.
Summons issued Oct. 8, 2013 in European application No. 09724428.9, filed on Feb. 17, 2009 (10 pages).
Excerpt from the book "Introduction to polymer chemistry—Where does attraction to polymers come from?", pp. 34-35, Mikiharu Kamachi, 2003, including partial translation.

* cited by examiner

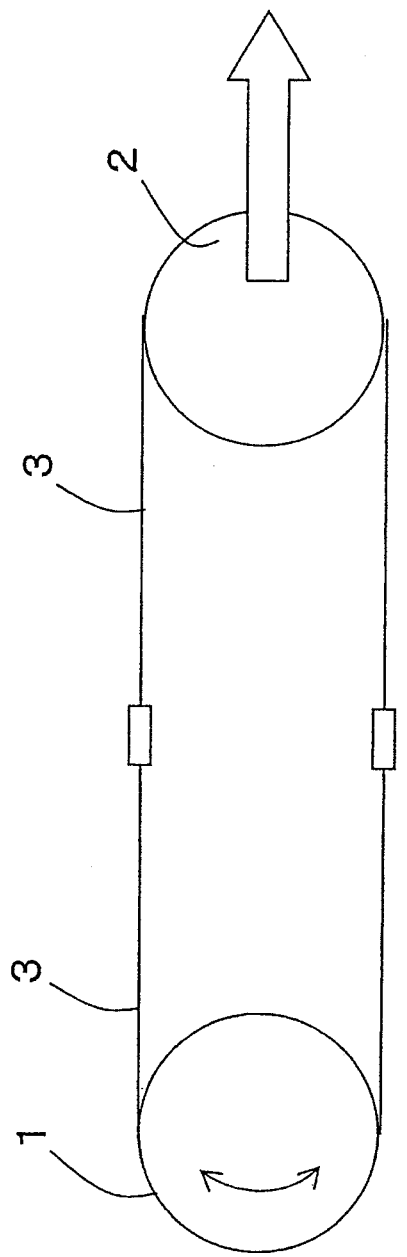

ORGANOPOLYSILOXANE COMPOSITION AND PROCESS FOR PRODUCING ROPE STRUCTURE WITH THE SAME

CROSS REFERENCE TO RELATED APPLICATIONS

This application is a continuation application, under 35 U.S.C. §111(a), of the international application No. PCT/JP2009/000642, filed Feb. 17, 2009, which claims priority to Japanese Patent Application No. 2008-078670, filed Mar. 25, 2008, the disclosure of which is incorporated by reference in the entirety into this application.

FIELD OF THE INVENTION

This invention relates to the method for producing a rope structure, such as cords, ropes, and cables, excellent in fatigue resistances. In many cases, it is generally accepted that the ropes have a diameter of within the range between ¼ inches (6.4 mm) and 5 inches (127 mm), that the cables have a diameter of larger than 5 inches (127 mm), and that the cords have a diameter of smaller than ¼ inches.

BACKGROUND ART

Conventionally, rope structures such as cords, ropes and cables, are widely used as industrial materials in the fields, for example, land and maritime industries, fisheries industries, and agriculture. Synthetic fibers such as polypropylene, nylon, and vinylon fibers have been used as constituting yarns of such rope structures in the above-mentioned fields. However, the rope structures made of such synthetic fibers are easy to cut due to fatigue during repeated use; therefore it is difficult to elongate their working lifetime.

In particular, in accordance with use subdivision, technical diversification, etc. in the recent land and fishery material fields, there is a tendency that a performance required for products is becoming higher and greater. When these rope structures are used for lifting a high mass object through a sheave, a drum, a pulley, etc. from the ocean, the rope structures are sometimes suffered from severe damage.

For Example, Japanese Laid-open Patent Publication No. 2-210072 (Patent Document 1) discloses a fiber with a higher tenacity and a higher modulus in which an organopolysiloxane represented by the following formula and a fluororesin are adhered to a fiber having a tenacity of not lower than 10 g/d and a modulus of not lower than 400 g/d.

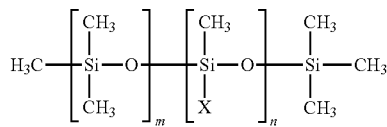

wherein, each of m and n independently represents an integer of not less than 1, X represents a group of OH, $NH_2$, R—OH, or R—$NH_2$, and R represents an alkyl group or a phenyl group.

According to the above-mentioned invention, the abrasion resistance of the fibers is improved by combining the organopolysiloxane with the fluororesin, and further applying them to fibers with a higher tenacity and a higher modulus.

Moreover, U.S. Pat. No. 6,945,153 (Patent Document 2) discloses a braided rope made of a blend of high modulus polyethylene (HMPE) filaments and lyotropic polymer or thermotropic polymer filaments in order to prolong the fatigue life of the braided rope.

[Patent Document 1] Japanese Laid-open Patent Publication No. 2-210072

[Patent Document 2] U.S. Pat. No. 6,945,153

DISCLOSURE OF THE INVENTION

The Problems to be Solved by the Invention

However, the fatigue resistance of the fibers disclosed in Patent Document 1 is insufficient. Further, single application of the organopolysiloxane to the fibers with a higher tenacity and a higher modulus only achieves a reduced abrasion resistance of the fibers under wet condition or high temperatures. Accordingly, application of fluororesin is necessary in order to avoid decrease in abrasion resistance of fibers. However, the application of fluororesin requires the fibers to be subjected to high temperature calcination. As a result, the performance of the fibers may be deteriorated due to the high temperature calcination. Moreover, further improvement in fatigue resistance has been desired in the braided rope in Patent Document 2.

Accordingly, an object of the present invention is to provide an organopolysiloxane composition useful for producing a rope structure excellent in fatigue resistance, a rope structure with the composition, and a method for producing the rope structure.

Another object of the present invention is to provide an organopolysiloxane composition which gives improved fatigue resistance to a rope structure even if high load is applied to the rope structure, a rope structure with the composition, and a method for producing the rope structure.

A further object of the present invention is to provide an organopolysiloxane composition which gives fatigue resistance to a rope structure even if the rope structure is used under wet conditions and/or under high temperatures, a rope structure with the composition, and a method for producing the rope structure.

Means of Solving the Problems

As a result of intensive studies conducted by the inventors of the present invention in an attempt to solve the problem of the conventional technology, it has been found that by combining a liquid crystal polymer filament yarn with a specific organopolysiloxane (hereinafter sometimes referred to as polysiloxane) having a high degree of polymerization, a rope structure comprising the liquid crystal polymer filaments and the organopolysiloxane can attain an excellent fatigue resistance which cannot be realized in the conventional technique, especially an excellent fatigue resistance even under wet conditions and/or under high temperature, and thus they finally completed the invention.

That is, the present invention implemented based on the above findings is an organopolysiloxane composition for rope structures, applicable to liquid crystal polymer filaments, the composition comprising an organopolysiloxane having an average polymerization degree of 50,000 to 200,000 and represented by the following formula (I):

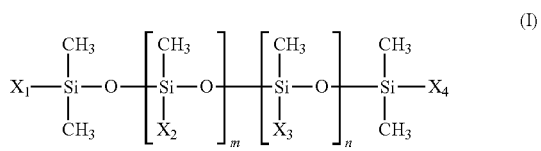
(I)

wherein, X1, X2, X3 and X4 are the same or different, each independently representing —H, —OH, —COOH, —R, —NH$_2$, —ROH, —RCOOH, or —RNH$_2$; R representing an alkyl group or an aryl group; and each of m and n independently denotes an integer of not less than 1.

The organopolysiloxane composition may further comprise at least one member selected from the group consisting of an emulsifier and a penetrant, and for example, the penetrant may comprise at least one member selected from the group consisting of a dialkyl sulfosuccinate and a silicone-series surfactant.

Further, the present invention includes a process for producing a rope structure, and the process comprises the following steps of:
forming or preparing liquid crystal polymer filaments,
forming yarns from the liquid crystal polymer filaments,
forming strands from the liquid crystal polymer yarns, and
forming a rope structure from the liquid crystal polymer strands; and the organopolysiloxane composition mentioned above is applied to at least a part of the liquid crystal polymer filaments in at least one step selected from the group consisting of the filament formation or preparation step, the yarn formation step, the strand formation step and the rope structure formation step. Incidentally, the process may substantially exclude a step of applying a fluororesin to the liquid crystal polymer filaments.

In the above-mentioned process, the liquid crystal polymer constituting the liquid crystal polymer filaments may comprise a wholly aromatic polyester.

Further, the present invention includes a rope structure comprising liquid crystal polymer filament yarns and the organopolysiloxane composition, as well as a rope structure produced by the above process.

Effect of the Invention

According to the present invention, the application of a specific organopolysiloxane having a high degree of polymerization to liquid crystal polymer filament yarns achieves the improvement in fatigue resistance of the rope structure comprising the yarns. Further, even if a high load is applied to the rope structure of the present invention or the rope structure is subjected to a wet and/or high temperature environment, the rope structure comprising the liquid crystal polymer filament yarns realizes excellent fatigue resistance.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims.

FIG. 1 is a schematic view showing how to measure the fatigue resistance of rope structures obtained in the following Examples.

DETAILED DESCRIPTION OF THE INVENTION

Process for Producing Rope Structure

The production process of the rope structure in the present invention comprises the following steps of: forming or preparing liquid crystal polymer filaments, forming yarns from the liquid crystal polymer filaments, forming strands from the liquid crystal polymer yarns, and forming a rope structure from the liquid crystal polymer strands, wherein a specific organopolysiloxane composition is applied to at least a part of the liquid crystal polymer filaments in at least one step selected from the group consisting of the filament formation or preparation step, the yarn formation step, the strand formation step and the rope structure formation step.

(Liquid Crystal Polymer Filament Formation or Preparation Step)

In the present invention, either thermotropic liquid crystal polymer filaments (e.g., wholly aromatic polyester filaments) or lyotropic liquid crystal polymer filaments (e.g., wholly aromatic polyamide filaments) can be used as liquid crystal polymer filaments. Further, these liquid crystal polymer filaments can be used in combination. Furthermore, the liquid crystal polymer filaments may be prepared from commercially available products, or may be formed or spun from liquid crystal polymers.

Examples of the wholly aromatic polyamide filament may include, for example, praraphenylene phthalamide filaments, aromatic polyether amide filaments, and others. The praraphenylene phthalamide filaments are commercially available under the registered tradenames of "KEVLAR" from Dupont, and "TWARON" from Teijin Techno Products Ltd.; the aromatic polyether amide filaments are commercially available under the registered tradename of "TECHNORA" of Teijin Ltd.

Among these liquid crystal filaments, wholly aromatic polyester filaments are preferable in view of exerting excellent fatigue resistance under wet conditions.

The wholly aromatic polyester filaments are made of a polyarylate-series polymer capable of forming an optically anisotropic melt phase. The polymer is obtainable by polymerization of an aromatic diol, an aromatic dicarboxylic acid, an aromatic hydroxycarboxylic acid, and others. Examples of the polymers may include a combination of repeating units as indicated by the following (1) to (11).

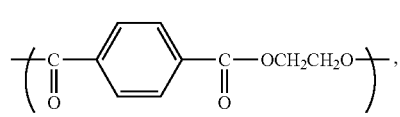
(1)

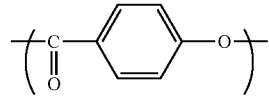

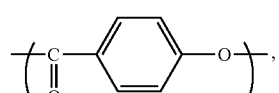
(2)

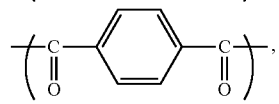

(3)

(4)

Wherein each of the X, X', Y and Y groups independently represents H, Cl, Br or CH₃; Z represents , or

.

(5)

(6)

(7)

(8)

(9)

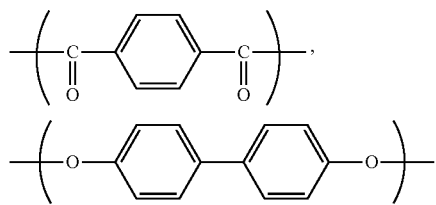
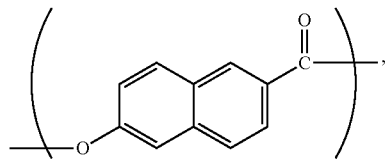
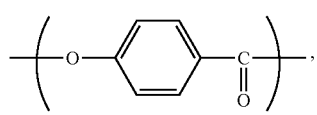

(10)

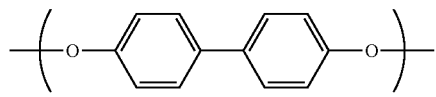
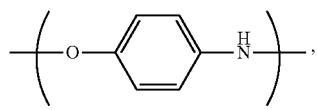
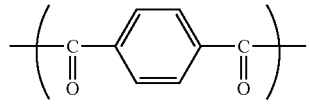
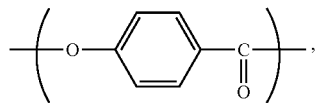

(11)

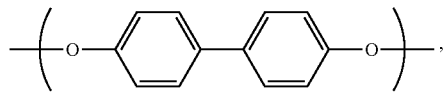
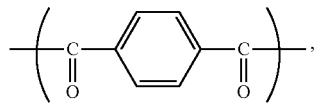
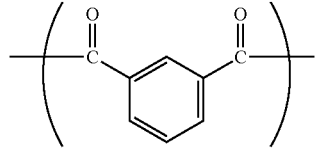

In particular, the preferable one includes a wholly aromatic polyester comprising the combination of the following repeating units of (A) and (B) in a proportion of not lower than 80 mol % in total. Among them, a wholly aromatic polyester comprising the repeating unit (B) in a proportion of 3 to 45 mol % is particularly preferred.

(A)

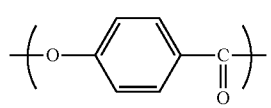

(B)

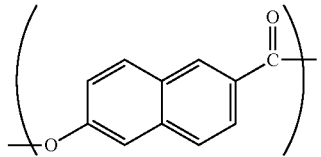

The phrase "a polymer capable of forming an optically anisotropic melt phase" herein means that the polymer shows an optically anisotropic property in a melt phase. This property can be recognized, for example, by observing a transmitted light from a sample that is placed on a heating stage and heated at an elevated temperature under nitrogen atmosphere.

The wholly aromatic polyester filaments preferably comprise a polyarylate-series polymer capable of forming an optically anisotropic melt phase having a melting point (hereinafter referred to as Mp) preferably within the range of between 260° C. and 360° C. and, more preferably within the range of between 270° C. and 350° C. It should be noted that Mp can be determined by measuring a temperature at which a largest endothermic peak of the polymer appears with the use of a differential scanning calorimeter (Mettler DSC).

The polyarylate-series polymer capable of forming an optically anisotropic melt phase may contain thermoplastic polymers such as polyethylene terephthalates, modified polyethylene terephthalates, polyolefins, polycarbonates, polyarylates, polyamides, polyphenylene sulfides, polyester ether ketones, and fluororesins, within the range of not deteriorating the effect of the present invention.

Then the concept of a spinning using the polymer capable of anisotropic melt (melt-anisotropic polymer) is now described. When the melt-anisotropic polymer is extruded through a spinneret at a shear rate of $10^3$ to $10^5$ sec$^{-1}$, extremely high molecular orientation is induced in the melt-anisotropic polymer. As a result, such filaments after spinning have a tenacity of not lower than 8 cN/dtex and a modulus of not lower than 400 cN/dtex even if the filaments are not subjected to drawing that is conventionally necessary for ordinary as-spun yarns made of polyethylene terephthalate and others. When circular spinnerets are employed, the shear rate (γ), as referred to in this invention, is calculated from the following formula:

$$\gamma = 4Q/\pi r^3 (\text{sec}^{-1})$$

wherein "r" is a radius of spinneret hole (cm), and "Q" is the rate of extrusion of the polymer per hole (cm$^3$/sec)

The tenacity and/or modulus of the as-spun yarns can be increased by heat treatment. The heat treatment is preferably performed at a temperature of (Mp-80)° C. to Mp ° C. Since the melting point of the wholly aromatic polyester filaments employed in the present invention gradually increases with increasing the temperature of the heat treatment, the heating temperature may be preferably elevated in stages. The suitable atmosphere in the heat treatment may be inert gas such as nitrogen or argon, active gas such as oxygen, or combination of these gases. Moreover, the heat treatment may be performed under a reduced pressure.

Such wholly aromatic polyester filaments are available, for example, under the registered tradename "VECTRAN" from Kuraray Co., Ltd.

The liquid crystal polymer filament usually has a single fiber fineness of about 0.1 to 100 dtex, preferable about 1.0 to 50 dtex.

The tenacity of the liquid crystal polymer filament may be, for example, preferably about 10 to 100 cN/dtex, more preferably about 15 to 80 cN/dtex. The modulus of the liquid crystal polymer filament may be, for example, preferably about 300 to 2,000 cN/dtex, more preferably about 450 to 1,500 cN/dtex.

Further, the liquid crystal polymer filament may comprise, if desired, inorganic substances, such as titanium oxide, kaolin, silica, and barium oxide; colorants such as carbon black, dyes and pigments; antioxidants; ultraviolet absorptive agents; light stabilizers; and various additives.

(Liquid Crystal Polymer Yarn Formation Step)

The liquid crystal polymer filaments are bundled, if desired, the bundles are twisted, to form a liquid crystal polymer filament yarn that is a basic component of the rope structure. The number of filaments to constitute one yarn may be, for example, about 50 to 5,000 filaments, preferably about 100 to 4000 filaments, more preferably about 150 to 3,000 filaments.

(Liquid Crystal Polymer Strand Formation Step)

In the strand formation step, a given number of yarns are bundled, twisted or braided to form a strand. It should be noted that where the twisted yarns are employed to form a twisted strand, the strand is usually twisted in the direction opposite to the twisted yarns. Further, the strand formation step may comprise a several formation steps, such as a first strand formation step to form a first strand from a given number of yarns, and a second strand formation step to form a second strand from a given number of the first strands.

The number of yarns to form a strand is freely decided depending on the size and/or tenacity of the rope structure desired, and may be, for example, about 2 to 50 yarns, preferably about 2 to 30 yarns, more preferably about 2 to 10 yarns.

Rope Structure Formation Step)

In the rope structure formation step, a given number of strands are bundled, and twisted or braided to form a rope structure. It should be noted that where the twisted strands are employed to form a twisted rope structure, the rope structure is usually twisted in the direction opposite to the twisted strand.

The number of strands to form a rope structure is freely decided depending on the size and/or tenacity of the rope structure desired, and may be, for example, about 2 to 50 strands, preferably about 2 to 30 strands, more preferably about 2 to 20 strands.

[Organopolysiloxane Composition]

In the present invention, the process for producing the rope structure comprises a step for applying an organopolysiloxane composition of the present invention to at least a part of the liquid crystal polymer filaments. The organopolysiloxane composition of the present invention at least comprises a specific organopolysiloxane as described below.

(Organopolysiloxane)

The organopolysiloxane employed in the present invention comprises a repeating unit represented by the following formula (I)

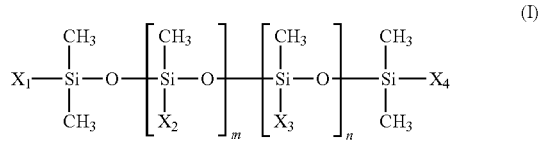

wherein, X1, X2, X3 and X4 are the same or different, and each independently represents —H, —OH, —COOH, —R, —NH$_2$, —ROH, —RCOOH, or —RNH$_2$; R represents an alkyl group (e.g., an C$_{1-5}$alkyl group such as methyl group or ethyl group) or an aryl group (e.g., a phenyl group); and each of m and n independently represents an integer of not less than 1.

The important point of the present invention is that this organopolysiloxane has a high polymerization grade, i.e., an average polymerization degree of 50,000 to 200,000. Although the clear reason is not certain why organopolysiloxane with such high polymerization grade could effectively works in the present invention, the following mechanism can be considered. That is, when liquid crystal polymer filaments are bundled without application of the polysiloxane to form a rope, fiber-to-fiber friction occurs in the bundled filaments, and such friction generates between the liquid crystal polymer filaments. As a result, the filament-to-filament friction causes fibrillation of the filaments, resulting in deterioration of the fatigue resistance of the rope structure.

On the contrary, when polysiloxane with a high degree of polymerization is applied to the liquid crystal polymer filaments, the polysiloxane can penetrate between the filaments with maintaining its high degree of polymerization, and may impart to the yarns smoothness as well as may form a coating layer on the yarn or filament surface. Accordingly, it is considered that such coating may reduce friction between the liquid crystal polymer fibers or filaments, thereby improving the fatigue resistance of the rope structure.

It should be emphasized that such an fatigue resistance cannot be achieved by using a polysiloxane with a low molecular weight, and that the conventional art has never mentioned the technical idea of applying a polysiloxane with a high degree of polymerization to a rope structure comprising a specific fiber materials to improve fatigue resistance of the rope structure.

The average degree of polymerization of such high molecular weight polysiloxane is about 50,000 to 200,000, preferably about 70,000 to 170,000 (e.g., about 70,000 to 150,000), and more preferably about 85,000 to 160,000.

From the viewpoint of low electrification, each of X1, X2, X3, and X4 (hereinafter each of them may be simply referred to as X) in the polysiloxane (I) represented by the formula (I) is independently preferably hydrogen atom, an alkyl group, or an aryl group. The more preferable polysiloxane is a polysiloxane in which X is methyl group (i.e., polydimethylsiloxane).

Moreover, in order to improve surface smoothability of the filaments, the preferable polysiloxane is a polysiloxane in which X1, X2, and X4 are methyl group and X3 is hydroxyl group.

The amount of polysiloxane to be applied to the rope structure is not limited as long as it can improve the fatigue resistance of the rope structure, and may be for example, relative to 100 parts by mass of liquid crystal polymer filaments in total, not lower than 0.1 part by mass, preferably not lower than 0.3 part by mass; and not higher than 10 parts by mass, preferably not higher than 5 parts by mass.

(Emulsifying Agent)

The organopolysiloxane composition may comprise an emulsifying agent (emulsifier) in addition to the organopolysiloxane (I). Although the polysiloxane with a high degree of polymerization may be directly adhered to filaments, the preferable way is to adhere to the filaments a dispersion in which the polysiloxane is emulsified with an emulsifier in view of uniform adherence of the polysiloxane to the filaments. Moreover, the surface smoothness of the fiber or filaments can be improved by combining an emulsifier with a polysiloxane with a high degree of polymerization.

The emulsifier may be any of nonionic, anionic or cationic emulsifier. Examples of the nonionic emulsifier may include polyoxyethylene ethers (e.g., polyoxyethylene alkyl ethers, polyoxyethylene alkyl aryl ethers, polyoxyethylene aryl ethers), polyethylene glycol esters, and the like. Examples of the anionic emulsifier may include, for example, metallic soaps; alkylbenzene sulfonates such as sodium alkylbenzene sulfonate; alkylnaphthalene sulfonates such as sodium alkylnaphthalene sulfonate; and the like. Examples of the cationic emulsifier may include, for example, quaternary ammonium salts, such as monoalkylammonium chloride and dialkylammonium chloride.

These emulsifiers can be used singly or in combination. Among them, the combination of anionic and nonionic emulsifiers is particularly preferred.

The amount of emulsifier to be used may be, relative to 100 parts by mass of polysiloxane, about 1 to 80 parts by mass, preferably about 5 to 70 parts by mass, and more preferably about 10 to 60 parts by mass.

(Penetrating Agent)

The organopolysiloxane composition may comprise a penetrating agent (penetrant) in addition to the organopolysiloxane (I). In particular, in order to improve penetration of the polysiloxane with a high degree of polymerization between the filaments, the penetrants may be used in combination with the emulsifier. From a viewpoint of reducing the surface tension of the polysiloxane solution or emulsion to adhere the polysiloxane to filaments uniformly, examples of the penetrant may include dialkyl sulfosuccinates, silicone-series surfactants (e.g., polyether-modified silicones, polyglycerin-modified silicones), and the like. These penetrants can be used singly or in combination. Among them, the preferable penetrant includes dialkyl sulfosuccinate.

The amount of penetrant to be used may be, relative to 100 parts by mass of polysiloxane, about 0.5 to 10 parts by mass, preferably about 1 to 8 parts by mass, and more preferably about 1.5 to 7 parts by mass.

(Organopolysiloxane Composition Application Step)

In the organopolysiloxane composition application step, the organopolysiloxane composition is applied to at least a part of the liquid crystal polymer filaments.

In the rope structure obtained through the above polysiloxane composition application step, the polysiloxane may be adhered to at least a part of liquid crystal polymer filaments as long as it can improve the fatigue resistance of the rope structure. Alternatively, the polysiloxane may be adhered to entire filaments.

The method for applying the polysiloxane to the filaments is not restricted to a specific one as long as the polysiloxane may be adhered to at least a part of liquid crystal polymer filaments, and the organopolysiloxane composition may be applied as described above, i.e., in at least one step selected from the group consisting of the filament formation or preparation step, the yarn formation step, the strand formation step and the rope structure formation step.

The application methods may include, for example, impregnation treatment, discharging or spray treatment, coating treatment, dip-squeeze treatment, and others. These treatments can be applied to either entire rope structure or any components of the rope structure (e.g., filaments, yarns, strands).

By way of example of impregnation treatment, the entire object to be impregnated (i.e., at least one member selected from the group consisting of filaments, yarns, strands, and rope structures) can be immersed in an impregnating bath containing the polysiloxane composition, and then the object can be dried and/or heated to adhere the polysiloxane composition to the liquid crystal polymer filaments.

Moreover, in the discharging treatment, a polysiloxane solution or emulsion containing the polysiloxane in a predetermined concentration (as a stock solution or diluted solution) is discharged from a drafting-pen-shaped spout (or nozzle) to a running object (e.g., filaments, yarns, strands, rope structures) running at a constant speed. Thus, the polysiloxane composition can be adhered to the liquid crystal polymer filaments.

Further, in the coating treatment, a running object (e.g., filaments, to yarns, strands, rope structures) is fed to a roller a part of which is immersed in a polysiloxane solution or emulsion. Thus, the polysiloxane composition can be adhered to the liquid crystal polymer filaments.

Further, in the dip-squeeze treatment, a running object (e.g., filaments, yarns, strands, rope structures) is dipped in a polysiloxane solution or emulsion, and the dipped object is squeezed with a squeezer such as mangle. Thus, the polysiloxane composition can be adhered to the liquid crystal polymer filaments.

Compared to the impregnation treatment, the discharging treatment, the coating treatment and the dip-squeeze treatment are more preferable because they do not need a great quantity of equipment and cost for drying and heating the impregnated filaments.

Further, in order to increase the amount of polysiloxane to be adhered, the organopolysiloxane composition is preferably applied in the filament formation step or the yarn formation step, and more preferably in the filament formation step.

In addition, since the rope structure of the present invention comprises the polysiloxane with a high degree of polymerization, even if it substantially excludes a fluororesin, the fatigue resistance of the rope structure can be improved under wet conditions. Accordingly, the production process may substantially exclude a step of applying a fluororesin to the rope structure.

In the case where the rope structure comprises fluororesin, the production process of such rope structure requires filaments to be subjected to heat treatment under an extremely high calcination temperature, thereby the fiber quality may be deteriorated due to high temperature. On the contrary, if the rope structure substantially excludes fluororesin, the production process can exclude high calcination step (e.g., the step of calcining fibers at not lower than 200° C.) to form the rope structure. Thus, deterioration in fiber quality due to high calcination temperature can be effectively avoided.

[Rope Structure]

The rope structure of the present invention comprises a yarn comprising liquid crystal polymer filaments, and the organopolysiloxane composition. The rope structure can be produced by the above mentioned production process.

More specifically, the rope structure of the present invention is a rope structure which comprises yarns comprising liquid crystal polymer filaments and an organopolysiloxane (I) having an average polymerization degree of 50,000 to 200,000 and being attached to at least a part of the filaments.

According to the present invention, by applying an organopolysiloxane (I) having a specific polymerization degree to a rope structure which comprises yarns comprising at least liquid crystal polymer filaments, the fatigue resistance of the rope structure is extremely improved. The rope structure may comprise liquid crystal polymer yarns alone, or may comprise liquid crystal polymer yarns and other polymer yarns (e.g., various kinds of high tenacity and high modulus organic fibers having a tenacity of not lower than 10 g/d and a modulus of not lower than 400 g/d) comprising a polymer other than liquid crystal polymer, as long as the other polymer yarn(s) are combined with the liquid crystal polymer yarn.

The diameter of rope structure is not limited to a specific one, and depending on its purpose, may be within a wide range between a small diameter as of cords and a large diameter as of cables. The diameter may be, for example, about 0.5 cm to 15 cm, preferably about 1 cm to 10 cm.

Moreover, examples of the rope structure may comprise a twisted rope structure, a braided rope structure, a multi-braided rope structure, and others.

Further, in order to improve water resistance and/or tenacity of the rope structure, the rope structure may be coated with a coating agent. Examples of such coating agents may include coal tar, bitumen, polyurethane, and the like.

EXAMPLES

Hereinafter, the present invention will be demonstrated by way of some examples that are presented only for the sake of illustration, which are not to be construed as limiting the scope of the present invention. It should be noted that in the following Examples, inherent viscosity (η inh) and melting point of the polyarylate-series polymer capable of forming an optically anisotropic melt phase, tenacity and modulus of the polymer filament were evaluated in the following manners.

[Inherent Viscosities]

A polymer specimen is dissolved in pentafluorophenol at a concentration of 0.1% by mass under a temperature of 60 to 80° C., and the relative viscosity (η rel) is measured by using a Ubbelohde viscometer in a thermostatic chamber at a temperature of 60° C. Then the inherent viscosity is calculated from the following equation:

$$\eta inh=\ln(\eta rel)/c$$

wherein c means concentration (g/dL) of the polymer.

[Melting Point]

Melting point, Mp, (° C.) was determined by observing a temperature at which a largest endothermic peak appears with the use of a differential scanning calorimeter (Mettler DSC).

[Tenacity and Modulus of Filaments]

Tenacity and modulus of filaments are determined in accordance with Japanese Industrial Standard (JIS) L 1013.

[Bend-Over-Sheave Fatigue Test]

As shown in FIG. 1, the test apparatus 1 for evaluating the bend-over-sheave fatigue had a fixed sheave 1 and a movable sheave 2. Two rope structures 3, 3 were placed on the fixed sheave 1 and the movable sheave 2, respectively, and their free ends were jointed together with a coupler. Then, while applying the tension of 7500 lbsfs to the movable sheave 2, the fixed sheave 1 was cycled at 6 times per minute and nominal stroke of 44 inches until the rope structure was broken. The cycle-to-failure of the rope structure was counted and the fatigue resistance of the rope structure was evaluated depending on the cycle-to-failure.

[Bend-Over-Sheave Fatigue Test with Applying Water]

Before conducting the bend-over-sheave fatigue test, a rope structure was immersed in water bath for about one hour. Then the rope structure taken out from the water was used as it was, and the bend-over-sheave fatigue test was conducted with dropping water at a rate of 1 litter/min. until the rope structure was broken. The cycle-to-failure of the rope structure was counted and the fatigue resistance of the rope structure after water application was evaluated depending on the cycle-to-failure.

[Bend-Over-Sheave Fatigue Test after Applying High Temperature and Humid Condition]

Before performing the bend-over-sheave fatigue test, a rope structure was pretreated in a thermo-hygrostat at a temperature of 80° C. and in a relative humidity of 80% for 700 hours. The rope structure was removed from the thermo-hygrostat and put into a test laboratory in the standard condition (temperature: 20±2° C., relative humidity: 65±2%). Then, the above fatigue test was conducted within 30 minutes after removing the rope structure from the thermo-hygrostat. The cycle-to-failure of the rope structure was counted until the rope structure was broken and the fatigue resistance of the rope structure after applying high heat and humid condition was evaluated depending on the cycle-to-failure.

Example 1

(1) Production of Liquid Crystal Polymer Filaments

The polymerization by the acetate method was performed in a preparation ratio of p-acetoxybenzoic-acid (A) and 2,6-acetoxynaphthoic-acid (B) being set to 7:3 (mole ratio) at the polymerization temperature of 310° C., and was prepared a wholly aromatic polyester polymer (η inh=5.8, Mp=280° C.) having repeating units (A) and (B) at a molar ratio of 7:3, respectively. The wholly aromatic polyester polymer was melted in a monoaxis-extruder and extruded through a spinneret of 300 holes (diameter of each hole: 0.15 mm) at a spinning temperature of 315° C., and the extruded polymer was taken up at a roller speed of 2,000 m/min. to produce an as-spun yarn of 1,670 dtex/300 filaments. The as-spun yarns were subjected to heat treatment under dry nitrogen atmosphere at 260° C. for 2 hours followed by at 280° C. for 12 hours to obtain liquid crystal polymer filaments (single-fiber fineness of 5.6 dtex, tenacity of 24.2 cN/dtex, modulus of 520 cN/dtex).

(2) Application Step of Polysiloxane to Filaments

To thus obtained liquid crystal polymer filaments, was attached a polysiloxane solution comprising 95 parts by mass of a polydimethylsiloxane having an average polymerization degree of 100,000 ("Matsumoto Softener 318" produced by Matsumoto Yushi-Seiyaku Co., Ltd.) and 5 parts by mass of sodium dioctyl sulfosuccinate as penetrant. The amount of polysiloxane to be attached was 2.5 parts by mass relative to 100 parts by mass of liquid crystal polymer filaments.

(3) Rope Formation Step

Two polysiloxane-applied filament yarns were bundled and twisted to form a strand, then 12 strands were bundled and twisted to form a rope having a diameter of ¾ inches.

The bend-over-sheave fatigue test was conducted with thus obtained rope. The result is shown in Table 1. Further, as for this rope, both the bend-over-sheave fatigue test with applying water and the bend-over-sheave fatigue test after applying high heat and humid condition were performed. The results are shown in Table 2.

Example 2

Except that the amount of polysiloxane to be applied to 100 parts by mass of liquid crystal polymer filaments was changed into 5 parts by mass, a rope was produced in the same way with Example 1. The result of the bend-over-sheave fatigue test with this rope is shown in Table 1.

Example 3

Except that the amount of polysiloxane to be applied to 100 parts by mass of liquid crystal polymer filaments was changed into 1 part by mass, a rope was produced in the same way with Example 1. The result of the bend-over-sheave fatigue test with this rope is shown in Table 1.

Example 4

Except that the average degree of polymerization of polysiloxane was changed into 170,000, a rope was produced in the same way with Example 1. The result of the bend-over-sheave fatigue test with this rope is shown in Table 1.

Comparative Example 1

Except that the average degree of polymerization of polysiloxane was changed into 45,000, a rope was produced in the same way with Example 1. The result of the bend-over-sheave fatigue test with this rope is shown in Table 1. Further, as for this rope, both the bend-over-sheave fatigue test with applying water and the bend-over-sheave fatigue test after applying high heat and humid condition was performed. The results are shown in Table 2.

Comparative Example 2

Except that the average degree of polymerization of polysiloxane was changed into 25,000, a rope was produced in the same way with Example 1. The result of the bend-over-sheave fatigue test with this rope is shown in Table 1.

Comparative Example 3

Except that an oiling agent comprising 60 parts by mass of paraffin-series emulsifier, 10 parts by mass of polyoxyethylene, 25 parts by mass of oleic acid ester, and 5 parts by mass of potassium oleate was used instead of the polysiloxane solution of Example 1, a rope was produced in the same way with Example 1. The result of the bend-over-sheave fatigue test with this rope is shown in Table 1.

TABLE 1

|  | Cycle-to-failure |
|---|---|
| Example 1 | 4036 |
| Example 2 | 4597 |
| Example 3 | 3105 |
| Example 4 | 3435 |
| Comparative Example 1 | 1697 |
| Comparative Example 2 | 1552 |
| Comparative Example 3 | 1040 |

As shown in Table 1, the rope structures of Examples showed more excellent fatigue resistance than those of Comparative Examples under high load. Accordingly, it is clearly determined that by applying a specific organopolysiloxane composition, the fatigue resistance of rope structures comprising liquid crystal polymer filaments can be improved.

TABLE 2

|  | Cycle-to-failure | |
|---|---|---|
|  | Water application | High temp. and humid application |
| Example 1 | 5940 | 4779 |
| Comparative Example 1 | 1324 | 2033 |

Further, as shown in Table 2, the rope structure of Example showed excellent results in the bend-over-sheave fatigue tests under high temperature and humid conditions. On the contrary, the rope structure of Comparative Example deteriorated in the bend-over-sheave fatigue tests under high temperature and humid conditions. Therefore, the application of a specific organopolysiloxane composition clearly improves fatigue resistance of the rope structures comprising liquid crystal polymer filaments both in highly humid or wet condition and in high temperature condition.

INDUSTRIAL APPLICABILITY

Since the rope structures of the present invention have a drastically improved fatigue resistance compared to the conventional rope structures, the rope structures are preferably applicable in the fields for fixation of the marine or land configurations, suspension of heavy load objects, traction, civil engineering, sports, leisure, and so on.

As mentioned above, the preferred embodiments of the present invention are illustrated, but it is to be understood that other embodiments may be included, and that various additions, other changes or deletions may be made, without departing from the spirit or scope of the present invention.

What is claimed is:

1. A process for producing a rope structure, comprising:
   forming or preparing liquid crystal polymer filaments,
   forming yarns from the liquid crystal polymer filaments,
   forming strands from the liquid crystal polymer yarns, and
   forming a rope structure from the liquid crystal polymer strands;
   wherein a organopolysiloxane composition is applied to at least a part of the liquid crystal polymer filaments in at least one step selected from the group consisting of the filament formation or preparation, the yarn formation, the strand formation and the rope structure formation; and
   wherein said composition comprising an organopolysiloxane having an average polymerization degree of 50,000 to 200,000 and represented by the following formula (I):

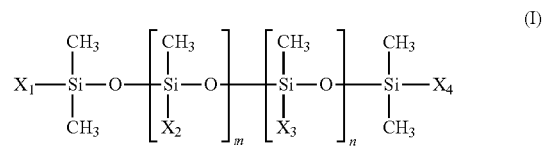

wherein, $X_1$, $X_2$, $X_3$ and $X_4$ are the same or different, each independently representing —H, —OH, —COOH, —R, —NH$_2$, —R'OH, —R'COOH, or —R'NH$_2$; R representing an alkyl group or an aryl group and R' representing an alkylene group or an arylene group; and each of m and n independently denotes an integer of not less than 1.

2. The process according to claim 1, wherein said organopolysiloxane composition further comprises at least one member selected from the group consisting of an emulsifier and a penetrant.

3. The process according to claim 2 wherein said organopolysiloxane composition comprises a penetrant which comprises at least one member selected from the group consisting of a dialkyl sulfosuccinate and a silicone-series surfactant.

4. The process as claimed in claim 1, wherein the organopolysiloxane composition is applied to the liquid crystal polymer filaments in the filament formation or preparation step.

5. The process as claimed in claim 1, wherein the liquid crystal polymer constituting the liquid crystal polymer filaments comprises a wholly aromatic polyester.

6. The process as claimed in claim 1, wherein the process substantially excludes a step of applying a fluororesin to the liquid crystal polymer filaments.

7. A rope structure produced by the process recited in claim 1.

8. A rope structure comprising liquid crystal polymer filament yarns, wherein an organopolysiloxane composition is applied to the filaments; and wherein said composition comprises an organopolysiloxane having an average polymerization degree of 50,000 to 200,000 and represented by the following formula (I):

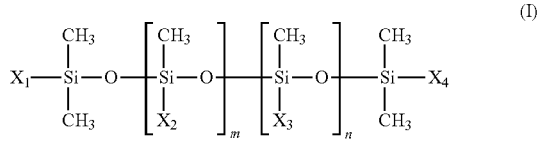

(I)

wherein, $X_1$, $X_2$, $X_3$ and $X_4$ are the same or different, each independently representing —H, —OH, —COOH, —R, —NH$_2$, —R'OH, —R'COOH, or —R'NH$_2$; R representing an alkyl group or an aryl group and R' representing an alkylene group or an arylene group; and each of m and n independently denotes an integer of not less than 1.

9. The rope structure according to claim 8, wherein said organopolysiloxane composition further comprises at least one member selected from the group consisting of an emulsifier and a penetrant.

10. The rope structure according to claim 8 wherein said organopolysiloxane composition comprises a penetrant which comprises at least one member selected from the group consisting of a dialkyl sulfosuccinate and a silicone-series surfactant.

* * * * *